United States Patent Office 3,550,365
Patented Dec. 29, 1970

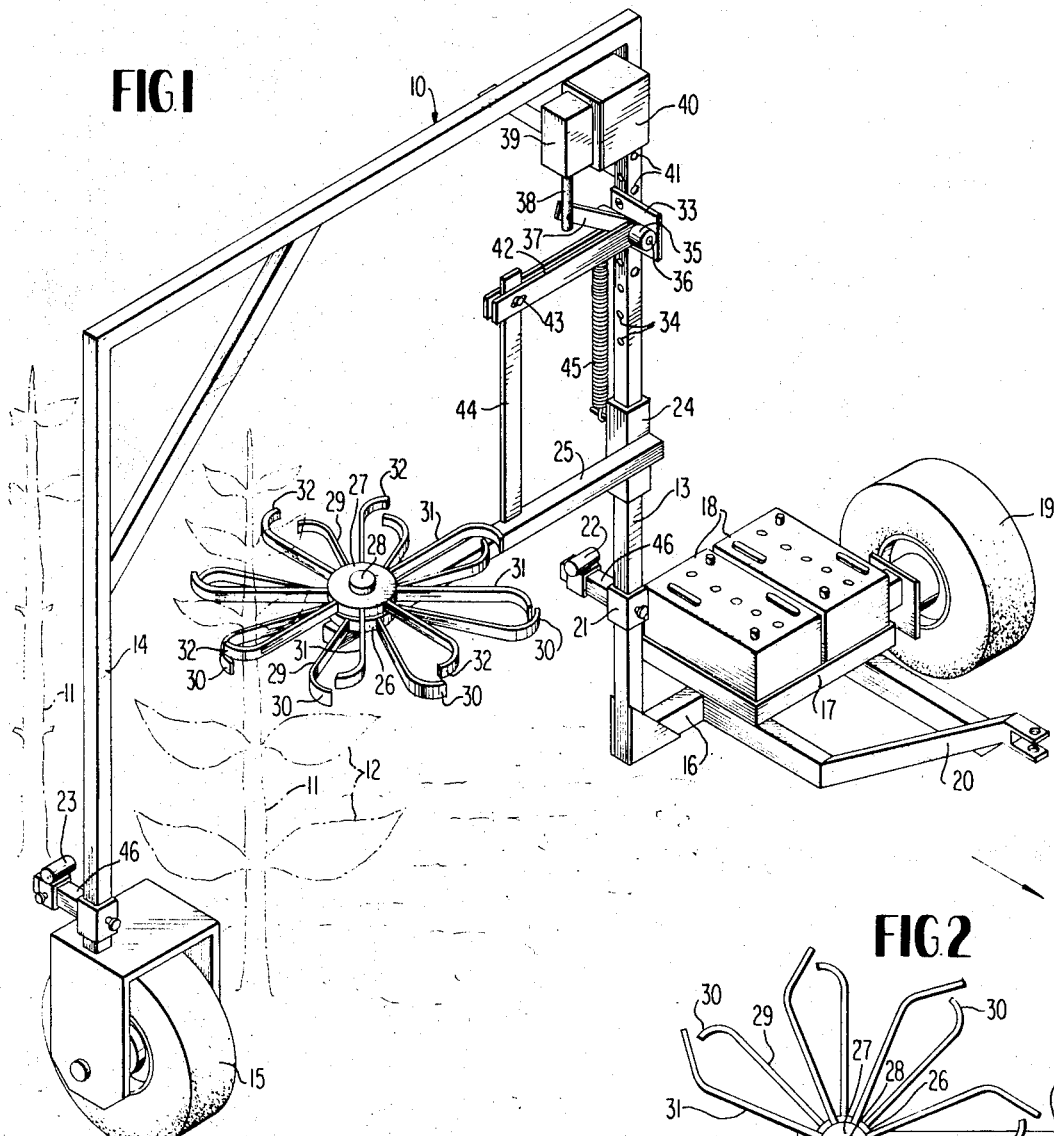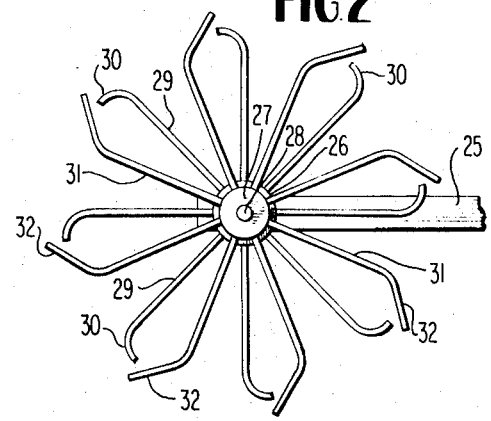

3,550,365
TOBACCO PRIMING APPARATUS
Wilson Lovett, Green Sea, S.C. 29545, and
Dale Burroughs, Rte. 1, Louis, S.C. 29569
Filed Dec. 6, 1968, Ser. No. 781,767
Int. Cl. A01d 45/16
U.S. Cl. 56—27.5          6 Claims

ABSTRACT OF THE DISCLOSURE

A tobacco priming apparatus which traverses a row of tobacco plants and removes tobacco leaves from selected portions of the plants by the vertical reciprocation of leaf stripping elements carried on free turning rotors, said elements having the ability to surround the main stalks of the plants prior to quick downward movement which separates the leaves from the stalks.

---

Various tobacco priming mechanisms have been proposed in the art and none of these has been completely satisfactory in the efficient removal of tobacco leaves from the main stalk without damaging the leaves. Some examples of the prior art are shown in United States Pats. 2,635,408; 2,834,173 and 2,969,069. The devices of these patents operate on the general principle of traversing a row of standing plants and engaging the leaves at a given height region on the plants and stripping the leaves downwardly by means of various forms of elements, fingers or rotors which contact the leaf stems and cut or snap them off. A significant defect of all of the prior art mechanisms has been that the elements acting directly on the leaves or their stems do not have the ability to surround the main stalks, thereby assuring contact with all leaves regardless of their relative positions around the circumference of the main stalks.

The objective and main thrust of the present invention is to improve upon the prior art tobacco priming devices and in particular to provide a unique leaf-engaging and stripping mechanism which includes free turning radial elements or spokes constructed to substantially completely surround each plant main stalk at the time of downward movement so that substantially all leaves radiating from the main stalk will be stripped, cut, snapped or separated. The invention also includes accurate sensing means setting into motion power means for shifting the leaf stripping elements downwardly at precisely the right moment when the main stalks are effectively surrounded by the free turning stripper elements.

BRIEF DESCRIPTION OF THE DRAWINGS

FIG. 1 is a perspective view of a tobacco priming apparatus embodying the invention.

FIG. 2 is a plan view of free-turning rotor elements.

DESCRIPTION OF THE PREFERRED EMBODIMENT

Referring to the drawings in detail, the priming apparatus comprises an arched frame 10 of sufficient height to clear a row of tobacco plants having main stalks 11 and tobacco leaves 12. The arched frame 10 passes over and straddles each row of plants and includes inboard and outboard vertical legs or posts 13 and 14, as shown. The outboard leg 14 is equipped at its bottom with a wheel 15 and the inboard leg carries at its bottom a horizontal extension bar 16 having a support cradle 17 for storage batteries 18 used to power electrical sensing means and mechanism actuator means, to be described. At its end, inwardly of the battery cradle 17, the bar 16 carries a wheel 19 axially aligned with the wheel 15. A suitable draft tongue 20 projects forwardly from the bar 16 so that the apparatus may be pulled behind a tractor or the like. In some cases, the apparatus shown in FIG. 1 may be duplicated in side-by-side units so that a single machine can process plural rows of plants simultaneously.

Adjustably mounted as at 21 on the lower portion of leg 13 is a photoelectric cell or eye 22, and directly opposite this photoelectric cell on the leg 14 is a coacting light source 23 which directs a beam of light on the cell 22 to activate the same. The main stalks 11 of the tobacco plants will successively interrupt the beam of light and de-activate the cell 22 to set certain power means into motion as will be fully described. All electrical connections are simple and conventional and need not be shown or described for a proper understanding of the mechanism.

Mounted slidably on the leg 13 above the cell 22 is a square sleeve 24 having a laterally projecting horizontal arm 25 rigid therewith and extending toward the row of plants but terminating short of the main stalks 11 in the row during use. The end portion of the lateral arm 25 supports for free rotation in horizontal planes lower and upper rotor hubs 26 and 27, turning around a suitable stub shaft 28. The lower hub 26 carries a plurality of circumferentially equidistantly spaced radial leaf stripping elements 29, spokes or fingers, all having their outer tips curved and extended in one direction as indicated at 30.

The upper rotor hub 27 carries a like group of equidistantly spaced radial stripper elements 31, spokes or fingers, whose outer tips are curved oppositely to the tips 30 or extensions, as shown at 32. It should be clearly understood that the fingers or elements 29 and 31 lie in vertically separate but closely spaced horizontal planes and that the two rotors are free turning and completely unpowered except by contact of the fingers 29 and 31 with the plant stalks 11. Also, the two rotors are completely independent in operation. As clearly shown in the drawings, the oppositely directed tips 30 and 32 are capable of interfitting and substantially surrounding the main stalks 11 so that each cooperating pair of stripper fingers on the upper and lower rotors will be capable of removing leaves 12 from the main stalks when the two rotors are shifted downwardly by means to be described, regardless of the circumferential location of particular leaves on the main stalks. It is this ability of the stripper elements to substantially surround the main stalks which is at the very heart of the invention.

In some cases, the lower edges of the fingers 29 and 31 may be sharpened to knife-like edges. This is particularly advantageous for removing the uppermost leaves on the plants which are tender and flexible. The lower leaves and their stems are more rigid and they tend to break off from the main stalk more readily. Additionally, the tips or extensions 32 are preferably made somewhat longer than the corresponding tips 30 to assure complete surrounding of the stalks 11. In this connection, the rotors shown in FIG. 1 may be considered somewhat diagrammatic so as to illustrate the principle of the invention rather than exact proportions of parts. FIG. 2 shows more precisely the configuration of the radial fingers and their tips.

Substantially above the sliding sleeve 24, an anchor plate 33 is bolted to the leg 13 rigidly. A series of openings 34 are provided in the leg 13 so that the plate 33 may be adjusted vertically to enable the apparatus to process all portions of the standing plants. While in one adjusted position, the apparatus removes leaves from only one region of the plants. In this way, the apparatus is employed with the plate 33 and arm 25 at different heights throughout the priming season. The plate 33 has bearings 35 for a rocker shaft 36 carrying a radial crank 37 pivoted to the plunger 38 or armature of an electrical solenoid 39 carried by a bracket means 40 in turn adjustably mounted on the leg 13 above the plate 33 by utilizing a selected one of another series of openings 41 in the leg.

The crank 37 is turned on the axis of rocker shaft 36 by the solenoid and includes an additional crank arm 42 pivoted at 43 to a push link 44 whose lower end is rigid with the horizontal bar or arm 25. There is a slotted connection for the pivot element 43 in the crank arm 42 so that vertical swinging of this crank arm may cause reciprocation of the horizontal arm 25 and sleeve 24 on the vertical leg 13 and consequently true up and down vertical movement of the two superposed horizontal rotors having hubs 26 and 27.

A retractile spring 45 has its lower end connected to the sleeve 24 and its upper end connected to the fixed plate 33, and this spring serves to return the arm 25 and rotors upwardly after the solenoid 39 is de-energized and after it has done its work by extending the plunger 38 downwardly and shifting the sleeve 24 and the rotors downwardly against the force of spring 45 to strip the leaves 12 from a given height region of the plant. The solenoid becomes energized to quickly shift the free wheeling rotors downwardly whenever one of the main stalks 11 interrupts the light beam to the photoelectric cell 22. This cell or eye then dictates to the solenoid 39 through convention circuitry to quickly shift the stripping assembly downwardly and as soon as the light source 23 moves beyond the particular main stalk 11 and again impinges on the light-sensitive cell 22, the solenoid will be de-energized and the spring 45 will quickly return the stripper assembly upwardly. In practice, this vertical reciprocation of the leaf stripping rotors may take place at a rate of about 5500 times per hour as the machine traverses the rows of plants at an even speed. It is essential that the downward and upward movement of the sleeve 24 and the entire stripper assembly take place quickly at each plant stalk 11 as the machine passes such stalk or plant. At the time, when the light beam is interrupted by the stalk 11 for activating the solenoid 39, the vertical axis of rotation of the rotors shown at 28 will be laterally aligned with the particular plant stalk.

As shown, the sensing elements 22 and 23 are mounted for horizontal adjustment on short arms 46 projecting rearwardly of the legs 13 and 14 so that the action of the stripper mechanism can be very finely adjusted relative to the passage of the apparatus along the row of plants.

To summarize briefly the mode of operation of the apparatus, the entire apparatus is drawn forwardly by the tractor in straddling relationship to a row of plants and with the wheels 15 and 19 positioned relative to the plants so that the free rotating fingers 29 and 31 will strike the main stalks 11 during passage of the apparatus along the row. These free turning fingers of the upper and lower rotors and their curved extensions or tips 30 and 32 will orient themselves by free turning so that one pair of fingers on each rotor will always assume a surrounding relationship to the particular main stalk 11 of the tobacco plant being processed at a given instant. The number of fingers on each rotor and the free turning operation of the rotors is such that the mathematical probability of a stalk 11 not being properly engaged by a pair of the fingers 29 and 31 is negligible.

At the instant when the particular stalk 11 interrupts the light beam to the cell 22 and energizes the solenoid 39, the arm 25 and both rotors will be quickly lowered and elevated over the particular vertical region of the plant stalk from which it is desired to strip or prime the leaves. This region will be determined by the vertical positioning of the plate 33 and bracket 40, as described. When the quick reciprocation of the arm 25 does take place, the coacting fingers 29 and 31 will be surrounding the particular stalk 11 and all tobacco leaves growing at any circumferential point on the stalk will be removed as described. The curved tips 30 and 32 allow the fingers to fully surround each stalk as shown clearly. The straight radial portions of the fingers complete the surrounding of the stalk and converge inwardly toward the shaft 28 as shown while they are operating on a given plant. Thus there is practically no chance for any leaf to escape the stripping operation of the fingers.

In lieu of the solenoid 39 for powering the mechanical linkage, a suitable fluid pressure operated cylinder means, such as a hydraulic cylinder, may be employed. If this is done, the operation of the cylinder means may be controlled by a conventional solenoid operated valve or the like, responsive to the electrical sensing means 22.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:
1. A tobacco priming apparatus comprising a mobile support adapted to traverse a row of standing tobacco plants, a tobacco leaf stripper unit mounted movably upon the support and adapted to be reciprocated vertically on the support, power means connected with said unit to cause said reciprocation of the unit, sensing means on the support connected with and activating said power means when said unit is properly positioned relative to individual tobacco plants to strip leaves from the main stalks of the plants, and plural free turning rotors mounted on said unit and forming parts thereof, each rotor having plural spaced radiating stripper fingers lying in a distinct substantially horizontal plane and the fingers of one rotor having outer tips directed laterally in one generally circumferential direction while the tips of the fingers of the next adjacent rotor are directed in the opposite circumferential direction, whereby coacting pairs of fingers on adjacent rotors may substantially completely surround the main stalks of tobacco plants during the time when said unit is reciprocated vertically, said free turning rotors being turned as a result of contact of said fingers with the main stalks of the tobacco plants during said traversing.

2. The apparatus of claim 1, wherein said plural rotors are a single pair of rotors whose plural fingers are circumferentially equidistantly spaced and whose oppositely direct tips are curved, the rotors of the pair lying in closely adjacent but separate horizontal planes and the rotors being on a common substantially vertical rotor axis.

3. The apparatus of claim 1, wherein said support comprises a generally inverted U-shaped support adapted to straddle and to pass over a row of tobacco plants, said support having a substantially vertical leg, said unit including a sleeve mounted on said leg for vertical reciprocation, an arm projecting substantially horizontally from said sleeve, said free turning rotors mounted on said arm, and a mechanical linkage interconnecting said arm and said power means.

4. The apparatus of claim 3, wherein said power means includes an electrical solenoid connected with said linkage and operable through the linkage to shift said unit downwardly, and a return spring connected with said unit to shift it upwardly when said solenoid is de-activated.

5. The apparatus of claim 4, wherein said sensing means is a light-sensitive electrical means connected with the solenoid to activate the same when a beam of light is interrupted by the main stalk of a tobacco plant.

6. The apparatus of claim 1, and means to allow vertical adjustment of said unit upon said support so that said unit may strip tobacco leaves from different vertical regions of plants in said row at different times.

References Cited
UNITED STATES PATENTS

| | | | |
|---|---|---|---|
| 2,635,408 | 4/1953 | Cox | 56—27.5 |
| 3,453,815 | 8/1969 | Harrington et al. | 56—27.5 |
| 3,482,379 | 12/1969 | Splinter et al. | 56—27.5 |

ROBERT PESHOCK, Primary Examiner